(12) United States Patent
Marco et al.

(10) Patent No.: US 11,710,039 B2
(45) Date of Patent: Jul. 25, 2023

(54) SYSTEMS AND METHODS FOR TRAINING IMAGE DETECTION SYSTEMS FOR AUGMENTED AND MIXED REALITY APPLICATIONS

(71) Applicant: PricewaterhouseCoopers LLP, New York, NY (US)

(72) Inventors: Timothy Marco, Chicago, IL (US); Joseph Voyles, Louisville, KY (US); Kyungha Lim, Naperville, IL (US); Kevin Paul, Chicago, IL (US); Vasudeva Sankaranarayanan, Chicago, IL (US)

(73) Assignee: PricewaterhouseCoopers LLP, New York, NY (US)

(*) Notice: Subject to any disclaimer, the term of this patent is extended or adjusted under 35 U.S.C. 154(b) by 353 days.

(21) Appl. No.: 17/036,098

(22) Filed: Sep. 29, 2020

(65) Prior Publication Data

US 2021/0097341 A1 Apr. 1, 2021

Related U.S. Application Data

(60) Provisional application No. 62/908,286, filed on Sep. 30, 2019.

(51) Int. Cl.
*G06N 3/08* (2023.01)
*G06V 20/20* (2022.01)
(Continued)

(52) U.S. Cl.
CPC ............. *G06N 3/08* (2013.01); *G06F 18/214* (2023.01); *G06V 10/40* (2022.01); *G06V 10/764* (2022.01);
(Continued)

(58) Field of Classification Search
CPC ...... G06K 9/6256; G06K 9/627; G06V 20/20; G06V 10/40; G06V 10/764; G06V 10/774;
(Continued)

(56) References Cited

U.S. PATENT DOCUMENTS 11,256,958 B1* 2/2022 Subbiah ................. G06N 20/00
11,494,930 B2* 11/2022 Theverapperuma ...... G06T 7/62
(Continued)

FOREIGN PATENT DOCUMENTS

WO 2018/222756 A1 12/2018

OTHER PUBLICATIONS

International Search Report and Written Opinion dated Dec. 18, 2020, directed to International Application No. PCT/US2020/053213; 13 pages.
(Continued)

*Primary Examiner* — Michael S Osinski
(74) *Attorney, Agent, or Firm* — Morrison & Foerster LLP

(57) ABSTRACT

Described are system, method, and computer-program product embodiments for developing an object detection model. The object detection model may detect a physical object in an image of a real world environment. A system can automatically generate a plurality of synthetic images. The synthetic images can be generated by randomly selecting parameters of the environmental features, camera intrinsics, and a target object. The system may automatically annotate the synthetic images to identify the target object. In some embodiments, the annotations can include information about the target object determined at the time the synthetic images are generated. The object detection model can be trained to detect the physical object using the annotated synthetic images. The trained object detection model can be validated
(Continued)

and tested using at least one image of a real world environment. The image(s) of the real world environment may or may not include the physical object.

16 Claims, 6 Drawing Sheets

(51) Int. Cl.

| | | |
|---|---|---|
| *G06F 18/214* | (2023.01) | |
| *G06V 10/764* | (2022.01) | |
| *G06V 10/774* | (2022.01) | |
| *G06V 10/82* | (2022.01) | |
| *G06V 10/40* | (2022.01) | |
| *G06V 20/64* | (2022.01) | |

(52) U.S. Cl.
CPC ............ *G06V 10/774* (2022.01); *G06V 10/82* (2022.01); *G06V 20/20* (2022.01); *G06V 20/64* (2022.01)

(58) Field of Classification Search
CPC .......... G06V 10/82; G06V 20/64; G06N 3/08; G06N 20/00; G06N 3/045; G06N 3/044; G06N 3/084; G06N 7/01; G06N 20/10; G06N 3/04; G06F 18/214; G06F 18/2413; G06F 18/217; G06F 3/011; G06T 2207/20081; G06T 7/70; G06T 19/006; G06T 2207/20084; G06T 11/00; G06T 15/04; G06T 17/00; G06T 19/20; G06T 2207/10016
See application file for complete search history.

(56) References Cited

U.S. PATENT DOCUMENTS

| | | | |
|---|---|---|---|
| 2014/0306996 A1* | 10/2014 | Cao ........................ | G06T 19/006 345/633 |
| 2018/0077376 A1* | 3/2018 | Armeni ................... | G06T 19/20 |
| 2018/0345496 A1* | 12/2018 | Li ........................... | G06F 30/20 |
| 2019/0147582 A1* | 5/2019 | Lee ......................... | G06T 11/00 382/156 |
| 2019/0156151 A1* | 5/2019 | Wrenninge ............ | G06K 9/6256 |
| 2019/0251397 A1 | 8/2019 | Tremblay et al. | |
| 2020/0074739 A1* | 3/2020 | Stauber .................. | G06F 3/011 |
| 2020/0089954 A1* | 3/2020 | Zia ......................... | G06V 20/64 |
| 2020/0342652 A1* | 10/2020 | Rowell .................... | G06T 7/75 |
| 2020/0380652 A1* | 12/2020 | Olaleye .................. | G06N 3/084 |
| 2020/0401835 A1* | 12/2020 | Zhao ...................... | G06N 3/084 |
| 2021/0034870 A1* | 2/2021 | Ha .......................... | G06T 13/20 |
| 2021/0150267 A1* | 5/2021 | Boulanger ............. | G06V 20/64 |
| 2021/0256307 A1* | 8/2021 | Papli ...................... | G06V 10/774 |
| 2021/0319363 A1* | 10/2021 | Gillberg ................ | G06V 10/774 |
| 2022/0260968 A1* | 8/2022 | May ....................... | G05B 19/401 |
| 2022/0358411 A1* | 11/2022 | Baek ...................... | G06N 20/00 |

OTHER PUBLICATIONS

Kashyap Chitta et al. (Nov. 2018). "Adaptive Semantic Segmentation with a Strategic Curriculum of Proxy Labels," Arxiv.org, Cornell University Library; pp. 1-10.

* cited by examiner

SYSTEMS AND METHODS FOR TRAINING IMAGE DETECTION SYSTEMS FOR AUGMENTED AND MIXED REALITY APPLICATIONS

CROSS-REFERENCE TO RELATED APPLICATIONS

This application claims the benefit of U.S. Provisional Application No. 62/908,286, filed Sep. 30, 2019, the entire contents of which are incorporated herein by reference.

FIELD

This disclosure relates generally to systems and methods for training systems to recognize real, physical objects for augmented reality applications and, more specifically, for automatically generating training dataset for training object detection models for augmented reality applications.

BACKGROUND

Internet-connected devices can be useful in a wide range of environments spanning from businesses to consumers. For example, facility and home automation can be used to control machinery, environmental conditions, and other aspects of the physical environment with ease. However, using internet-connected devices can be challenging for some users. The physical interfaces, such as switches and knobs, on these internet-connected devices can be an insufficient substitute given the rich feature set of modern devices. Additionally, the connection between specific controls and the corresponding device may not be immediately obvious to users.

Augmented reality (AR) and mixed reality (MR) applications can allow a device to place a virtual object in a user's view of the real world. These virtual objects can allow smart, flexible, and highly usable controls to appear to exist alongside the physical device, thereby creating an unambiguous connection between the device and its controls. To implement such an environment, AR and MR applications may benefit from a way to detect objects in the real world. The detected real world objects may be combined with virtual objects to create a more natural way for users to interact with their real world environments.

The detection and identification of real world objects in real world environments is often difficult since the objects can look different in different environments and from different angles and perspectives. However, collecting information on real world objects in a variety of locations, and environments is difficult, time intensive, and expensive.

Additionally, the training is very sensitive to the size, quality, and diversity of the training dataset. The large amount of volume and variety needed may be specifically inefficient for single use cases, such as a single AR application. Furthermore, in some instances, such as when the conditions (e.g., environment, objects, etc.) are rare, it may be difficult to collect these datasets. Accordingly, AR and MR applications may benefit from a solution having enhanced accuracy, enhanced efficiency, and decreased costs.

SUMMARY

Described are systems and methods for detecting objects in real world environments. In order to accurately detect objects in different environments, the described systems and methods may include creating synthetic images of the objects in a variety of environments and using these synthetic images as training dataset to train the detection model. By using synthetic images as the training dataset to train the detection model, the systems and methods can be trained to accurately detect objects in these different environments, and under different conditions, without the need for actual images of these objects in the different environments and under the different conditions.

The training dataset can also be automatically labeled by the system during creation, since the system already knows the features of the object and the environment of the images that are synthetically created. In some embodiments, the disclosed systems and methods can include creating and collecting the training dataset, annotating it, and training image detection models using this training dataset. In some embodiments the trained detection models are used for detecting real world objects in AR and MR applications.

Detecting real world objects can expand the capabilities of the system. As one example, the detection of real world objects can allow the system to place virtual objects in three-dimensional content aligned with a real world environment. The overlay of the virtual objects on the real world environment can be used for applications such as training, machine maintenance, device control, and more.

In some embodiments, a method for training a model is provided, the method comprising: generating a plurality of synthetic images, the generation including selecting parameters of environmental features, camera intrinsics, and a target object, the target object being a simulation of a physical object; annotating the plurality of synthetic images with information related to properties of the target object; and training the model to detect the physical object using the plurality of annotated synthetic images.

In some embodiments of the method for training the model: the method further comprising: assigning probabilistic weights to the plurality of synthetic images, the probabilistic weights representing a likelihood of the target object being associated to the selected parameters.

In some embodiments of the method for training the model: the generation of the plurality of synthetic images includes generating a greater number of synthetic images having high probabilistic weights than low probabilistic weights.

In some embodiments of the method for training the model: the generation of the plurality of synthetic images includes generating a number of synthetic images, wherein the number is not pre-defined.

In some embodiments of the method for training the model: each of the plurality of synthetic images has at least one parameter different from the others of the plurality of synthetic images.

In some embodiments of the method for training the model: the at least one parameter is one or more of: camera angle, lighting effects, and camera setting.

In some embodiments of the method for training the model: the at least one parameter is one or more of: target object size, target object color, and target object texture.

In some embodiments of the method for training the model: the annotation of the plurality of synthetic images includes using information from the generation of the plurality of synthetic images to define bounding boxes around the target object.

In some embodiments of the method for training the model: the annotation of the plurality of synthetic images includes adding class name and object location information to files representative of the plurality of synthetic images.

In some embodiments of the method for training the model: the training of the object detection model includes automatically identifying patterns in the plurality of annotated synthetic images that correlate to the targeted object.

In some embodiments of the method for training the model: the generation of the plurality of synthetic images includes not varying one or more target properties.

In some embodiments, a method for using a model to detect a real world object is provided, the method comprising: receiving an image of the real world object; using the model to detect the real world object, the objection detection model being trained by: generating a plurality of synthetic images, the generation including selecting parameters of environmental features, camera intrinsics, and a target object, the target object being a simulation of a physical object; annotating the plurality of synthetic images with information related to properties of the target object; and using the plurality of annotated synthetic images to detect the physical object.

In some embodiments of the method for using the model to detect the real world object: the model is used to instruct a user how to use, maintain, and/or repair a real world device.

In some embodiments, a system for training a model is provided, the system comprising one or more processors and a memory, wherein the one or more processors are configured to execute instructions stored on the memory to cause the system to: generate a plurality of synthetic images, the generation including selecting parameters of environmental features, camera intrinsics, and a target object, the target object being a simulation of a physical object; annotate the plurality of synthetic images with information related to properties of the target object; and train the model to detect the physical object using the plurality of annotated synthetic images.

In some embodiments of the system for training the model: the one or more processors are further configured to execute instructions stored on the memory to cause the system to: assign probabilistic weights to the plurality of synthetic images, the probabilistic weights representing a likelihood of the target object being associated to the selected parameters.

In some embodiments of the system for training the model: the generation of the plurality of synthetic images includes generating a greater number of synthetic images having high probabilistic weights than low probabilistic weights.

In some embodiments of the system for training the model: the generation of the plurality of synthetic images includes generating a number of synthetic images, wherein the number is not pre-defined.

In some embodiments of the system for training the model: each of the plurality of synthetic images has at least one parameter different from the others of the plurality of synthetic images.

In some embodiments of the system for training the model: the training of the model includes automatically identifying patterns in the plurality of annotated synthetic images that correlate to the targeted object.

In some embodiments of the system for training the model: the generation of the plurality of synthetic images includes not varying one or more target properties.

BRIEF DESCRIPTIONS OF THE DRAWINGS

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods and instrumentalities disclosed.

DETAILED DESCRIPTION

Described below are systems, methods, apparatuses, and computer program product embodiments for developing an object detection model. The object detection model may be used to detect a physical object in an image of a real world environment. Due to variations in the properties of real world objects, accurately detecting them may be difficult, especially in certain environments. For example, a real world object may look different depending on the lighting situation, the contrasts between the object and the environment, the angle the object is viewed, etc. In order to accurately detect the real world object, a large number of images may need to be captured, but this may be costly in terms of storage space and the amount of time needed to manually identify the object in the images.

Although the specification specifically discusses an object detection model, embodiments of the disclosure apply to any type of computer vision model including, but not limited to, a model that overlays instructions, images, or both on top of a real world image.

To address these problems, the object detection model disclosed herein automatically generates a plurality of synthetic images, in lieu of capturing a large number of images. The synthetic images are used as training dataset and can be generated by selecting parameters of the environmental features, camera intrinsics, and a target object. In some embodiments, the parameters may not be pre-defined. As a result, the parameters may differ during different training sessions of the object detection model. In some embodiments, the parameters may instead be selected at the time the training dataset are generated.

Instead of manually identify the objects in the training dataset, the disclosed systems and methods automatically annotate the training dataset to identify the target object, thereby decreasing the amount of time required to train the object detection model. In some embodiments, the annotations can include information about the target object determined at the time the training dataset are generated. The object detection model can be trained to detect the physical object using the annotated synthetic images. The disclosed embodiments further include validating the trained object detection model and testing it using at least one image of a real world environment. The image(s) of the real world environment may or may not include the physical object.

Figure 1:
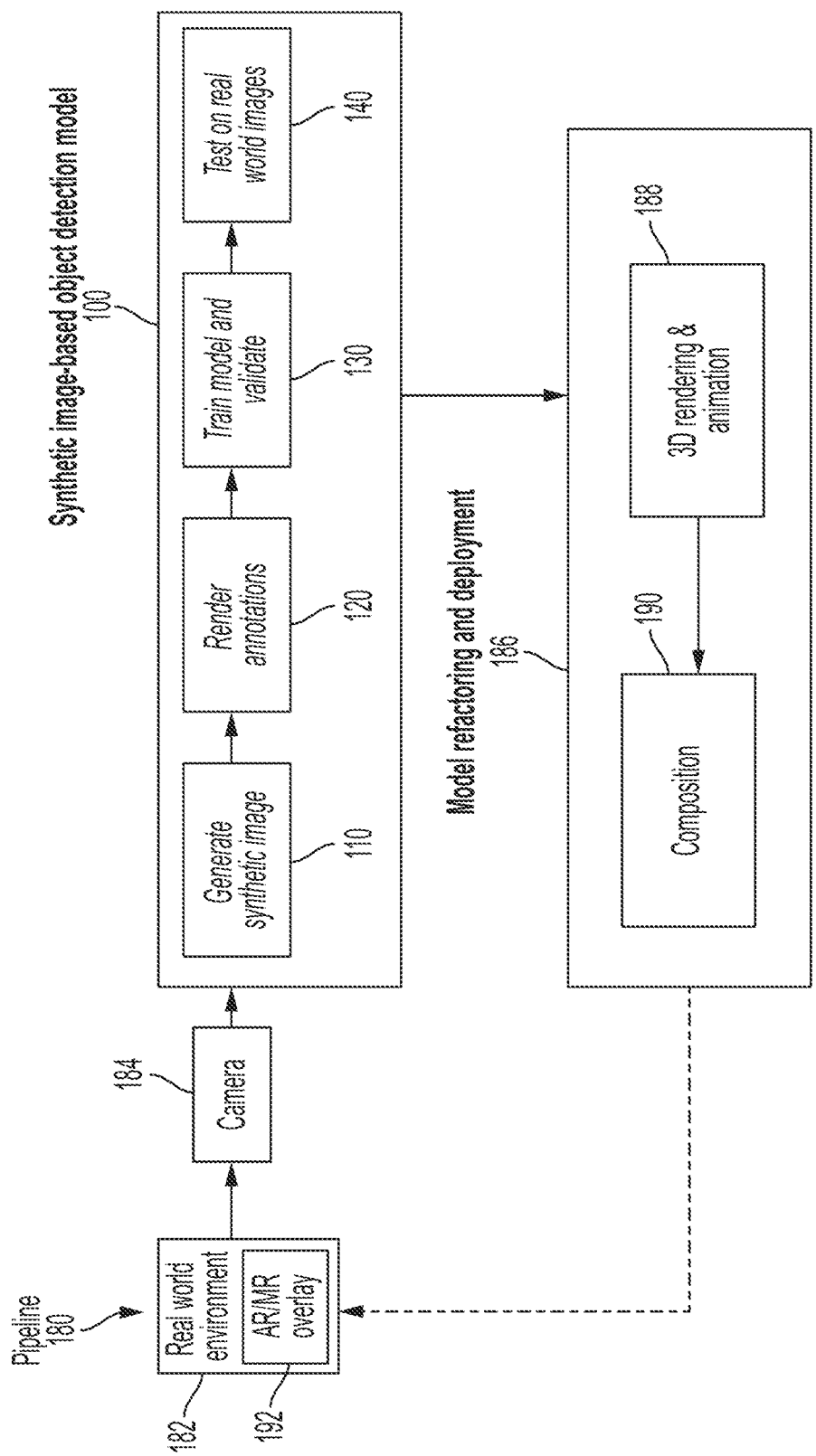
FIG. 1 illustrates a block diagram of an exemplary method training an object detection model using a plurality of synthetic images, according to some embodiments.

FIG. 1 illustrates a block diagram of an exemplary method training an object detection model using a plurality of synthetic images as the training dataset, according to some embodiments. As discussed in more detail below, the training dataset can include different images having variations in one or more of: camera intrinsics, environmental features, and target object properties. Examples of the disclosure can further include variations in other aspects of the images.

The method 180 may begin with the user being present in a real world environment 182. The user may use a device (e.g., mobile phone, tablet, laptop, etc.) that includes a camera 184 to capture images of an object in a real world environment 182 for an AR/MR application. The captured image may be input to a synthetic image-based object detection model 100. In some embodiments, the image of the object captured by the camera 184 may be a single image. In some embodiments, the camera 184 may be running in real time on live camera view, thereby capturing a plurality of images of the object. The model 100 may receive the plurality of images; or may receive a video and be capable of extracting a plurality of images of the object from the video.

The synthetic image-based objection detection model 100 can be developed using multiple steps including generating synthetic images 110, rendering annotated synthetic images for training 120 (i.e., training dataset), modeling training and validation 130, and testing the trained model using real world images 140. The steps of the model 100 are discussed in more detail below.

Once the model 100 is trained, validated, and tested, it can be repackaged and refactored for deployment at step 186 for deployment to a device. The model, when used, can be capable of producing an AR/MR overlay 192, which can be transferred to the real world environment 182 as viewed by the user. Model refactoring and deployment 186 can include 3D rendering and animation 188 and composition 190.

The disclosed method 180 may avoid the time-consuming process of acquiring and manually annotating large datasets necessary for training models. The model 100 can generate and use a number of synthetic images as the training dataset to recognize real, physical objects in the real world environment 182. In some embodiments, the number of synthetic images generated may be determined at the time of generation and may be based on one or more factors such as the target object properties, the range in probabilistic weights (discussed below), the variety in the environmental features, and the like. In some embodiments, the number of synthetic images generated by the model 100 may not be a predetermined number. By generating and using synthetic images as training dataset to train the model, the amount of time need to produce the image detection model can be significantly reduced and with minimal human intervention.

Figure 2A:
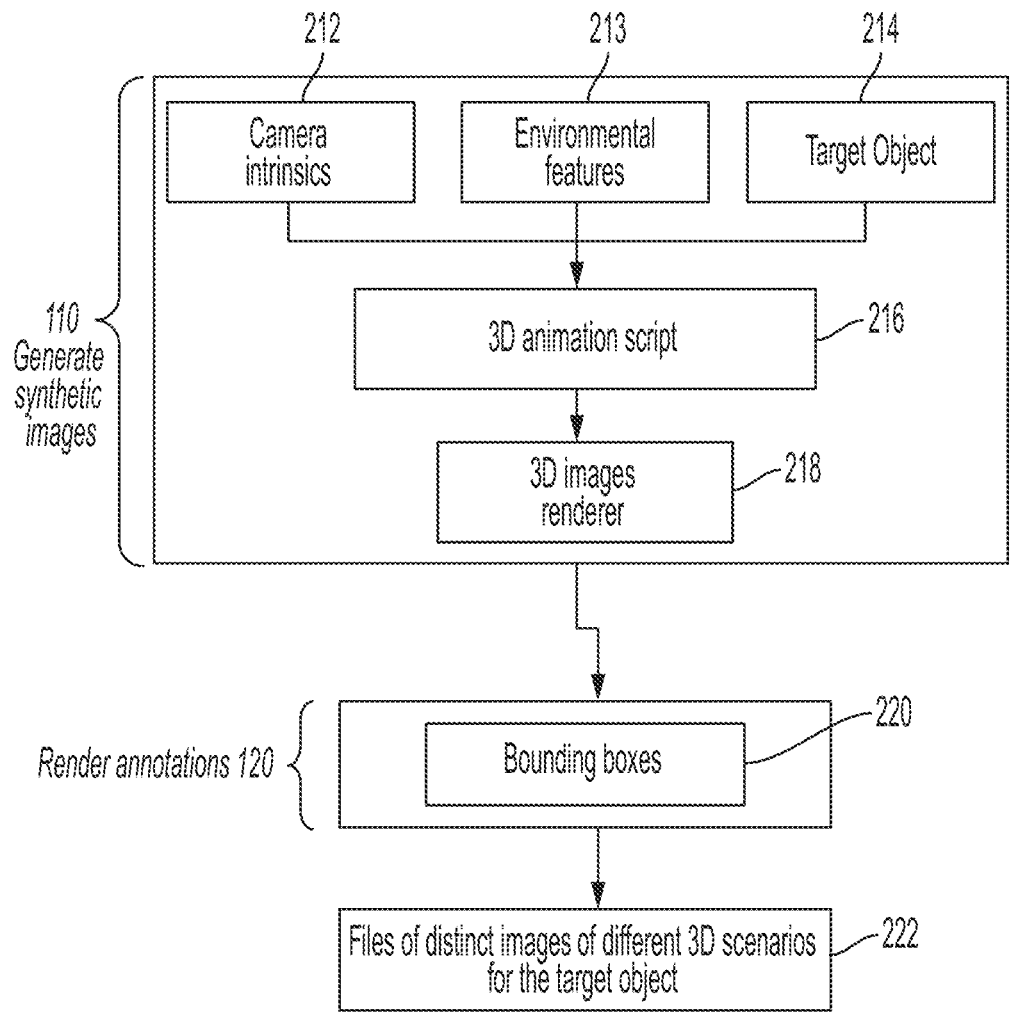
FIG. 2A illustrates a method for generating synthetic images for training dataset and rendering annotations, according to some embodiments.

Some of the steps in the model 100 can include generating synthetic images 110 and rendering annotations 120. FIG. 2A illustrates a method for generating synthetic images 110 and rendering annotations 120, according to some embodiments. In some embodiments, steps 110 and 120 can be run locally on the device (e.g., mobile phone, tablet, laptop, etc.) or in a cloud environment.

In some embodiments, the synthetic images may simulate photographs of the target object(s) in a virtual environment. The synthetic images may be generated using three-dimensional modeling and rendering software, for example. In some embodiments, the model 100 may generate a number of synthetic images. In some embodiments, the number of synthetic images generated may be not be a pre-determined number of images. With the ability to generate a number of synthetic images under a plurality of sets of environmental features, a wide variety of realistic scenarios can be captured reliably and automatically. The synthetic images may include distinct 3D scenarios captured in the form of a file, such as a CSV file.

Step 110 for generating synthetic images can use several blocks: camera intrinsics 212, environmental features 213, target object model 214, 3D animation script 216, and 3D images renderer 218. The generation of the plurality of synthetic images can include selecting one or more parameters of the camera intrinsics, environmental features, a target object, or a combination thereof.

In some embodiments, each of the plurality of synthetic images can be assigned a probabilistic weight. The probabilistic weight can represent the likelihood that the target object will be associated with a given parameter. As an example, the target object may be a computer. The computer may have a high probabilistic weight for environmental feature parameters that represent an office scene (as a computer has a high likelihood for being associated with an office), but a low probabilistic weight for environmental feature parameters that represent a forest or jungle scene (as a computer has a low likelihood for being associated with a forest). The range in probabilistic weights can be the difference in maximum and minimum probabilistic weights for the plurality of synthetic images. In some embodiments, the system can generate a greater number of synthetic images assigned to high probabilistic weights than assigned to low probabilistic weights.

Camera intrinsics 212 can represent one or more properties to simulate camera 184. In some embodiments, the 3D scenarios can include a wide variety of simulated conditions related to the camera 184, such as camera angles, light effects, camera settings, etc. In some embodiments, at least two of the synthetic images can simulate different camera angles, lighting effects, camera settings, or a combination thereof. In some embodiments, the creation of synthetic images can realistically simulate the precise properties of the model of camera 184. For example, the focal length, aperture size, sensor size, and other optical properties of the camera 184 can be simulated, thereby improving the performance of the model 100 in real-world settings. In some instances, the camera intrinsics 212 can be tailored to different virtual camera configurations.

Environmental features 213 can represent one or more properties of the environment to simulate the scene surrounding the target object. The disclosed system and methods can create robust, varied sets of synthetic images by parameterizing multiple features of the virtual environment. In some embodiments, simple environmental data (e.g., location of the floor, number of walls, etc.) can be created by directly defining the relative positions of the vertices. Additional exemplary parameters of the environmental feature can include, but are not limited to, color, texture (e.g., patterns on the wall), materials (e.g., paint on the wall) size, relative location, and the like.

Target object 214 can represent one or more properties of the target object. Example properties can include, but are not limited to, the location and orientation of the target object; the location and orientation of a virtual camera relative to the target object; and the intensity, color temperature, location, angle, and number of sources of light in the scene. Additionally or alternatively, the presence (or absence), location, variety, size, and appearance of virtual objects, other than the targeted object, within the virtual camera's field of view may be varied. In some embodiments, the geometry of the virtual scene may be varied. Example geometric features can include the number, size, and/or position of the walls, floors, ceilings, etc. In some embodiments, the system may vary the colors, textures, reflectivity, etc. of the virtual environment, such as wall color, carpet texture, and the like.

In some embodiments, the selection of parameters may take into account one or more target properties. In some embodiments, at least some of the target properties may be pre-determined (e.g., selected when the target object is selected) and may not be varied. For example, the target object may be a lamp, and the lamp's location on a desk may be a target property. In some embodiments, the probabilistic weights may take into account the target properties. For example, the lamp on the desk may have a high probabilistic weight for environmental feature parameters that represent an office scene, but a low probabilistic weight for environmental feature parameters that represent a forest or jungle scene.

Figure 2B:
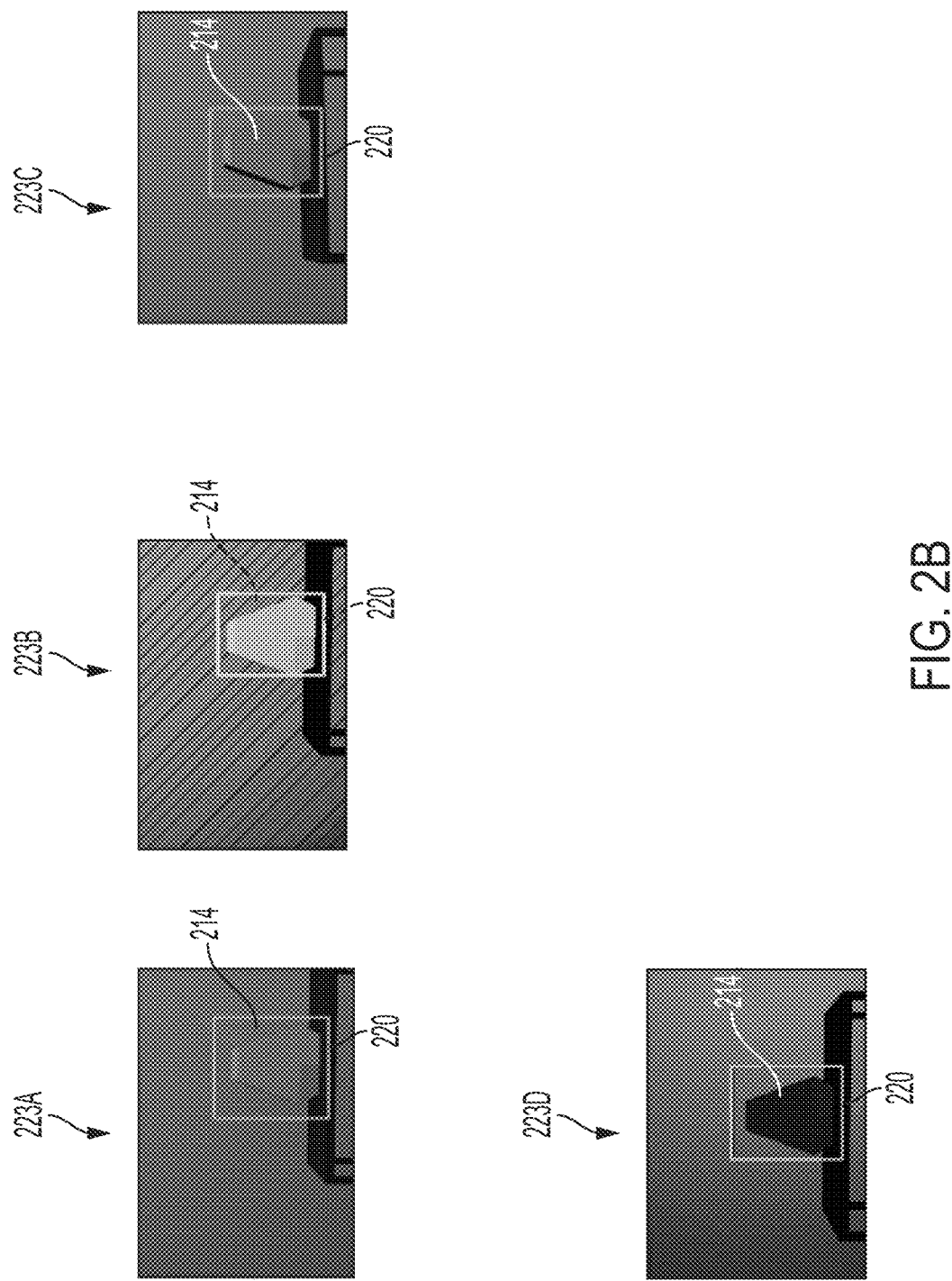
FIG. 2B illustrates exemplary training dataset generated at step 110, according to some embodiments.

FIG. 2B illustrates exemplary training dataset generated at step 110, according to some embodiments. As discussed above, the model 100 can vary the parameters to simulate the camera intrinsics 212, environmental features 213, and target object 214. For example, the system can create multiple training dataset 223A, 223B, 223C, and 223D each having different camera intrinsics 212 and/or environmental features 213. Training dataset 223A can differ from training dataset 223B by having a different pattern wallpaper behind the target object 214. Training dataset 223A can differ from training dataset 223C by having its camera positioned facing in the line of view of the front face of the target object 214. Training dataset 223D can have a scene of a room darker than the room in training dataset 223A. Additionally, the target object 214 of training dataset 223D can be located in the center of the training dataset 223, whereas, e.g., the target object 214 of training dataset 223A can be located closer to the right side of training dataset 223A. In some examples, the target object 214 can have different properties; such as being taller, as shown in FIG. 2D compared to FIG. 2A. One skilled in the art would understand that these parameters are just a few examples and any number of parameters can be varied in the training dataset.

As discussed above, target object 214 can be a simulated object that represents one or more parameters of the target object. Exemplary parameters of the target object can include, but is not limited to, what the target object is, and the size, color, texture, etc. of the target object. For example, the target object 214 shown in the training dataset 223A, 223B, and 223C can be a computer that is about 2" tall and is black in color. In some embodiments, at least two of the synthetic images generated in step 110 can have different target object size, color, texture, or a combination thereof. Additional exemplary parameters of the target object can include, but is not limited to, distance from another object (e.g., the wall).

In some embodiments, the target object 214 can be simulated using a target object model that is less sensitive to constraints on the size, optical properties, or other elements of the target object; as such, the reduced sensitivity can allow for a larger or significantly different set of detectable objects. Additionally, by using a simulated object to represent the target object, the overhead involved with collecting spatial data associated with objects for later detection can be removed.

Referring back to FIG. 2A, after the parameters of the camera intrinsics, environment features, and target object are selected and modeled, a 3D animation script 216 can use this information to generate a number of training dataset with variations of the parameters. The script can setup a virtual environment, position the camera in the virtual environment, and then render 3D training dataset 223 that simulate realistic photographs.

The model 100 can use the training dataset 223 and can annotate them with bounding boxes 220. In some embodiments, a bounding box can be an outline of the target object. The model 100 can execute scripts that annotate the position, location, and size of the target objects, and in some embodiments, may do so based on the geometric data in the virtual scene and/or properties of the simulated camera. In some embodiments, the bounding boxes 220 may be calculated and/or expressed relative to the coordinate space of the respective training dataset. Since the training dataset to be annotated may be based on three-dimensional models, the scripts can annotate the target objects automatically. In some embodiments, the scripts can annotate the target objects using information generated at the time the training dataset are generated (e.g., step 110), thereby leading to reduced costs (such as the amount of time). In some embodiments, the model 100 can annotate information customizable to various formats required by different models.

For example, in step 120, the system can annotate training dataset 223C, shown in FIG. 2B, with a bounding box 220. In some embodiments, the bounding box 220 can be added to the training dataset 223C to identify the target object. In some embodiments, the file for each training dataset may be annotated with added information such as a class name and object location. The class name can be a string that identifies what the object is. The object location can be positional information, such as x- and y-position, height, and width in pixels relative to the image's coordinate system.

Returning back to FIG. 2A, following the generation of the training dataset 110 and rendering of annotations 120, the model 100 can generate and store files 222 of distinct training dataset. In some embodiments, the distinct training dataset can include different 3D scenarios for the target object, as discussed above. In some embodiments, each training dataset can include at least one parameter different from another training dataset. In some embodiments, the files can include the annotations rendered at step 120. In some embodiments, the files can include information corresponding to geometric data (e.g., meshes) and data related to the appearances (e.g., textures) of objects.

Figure 3A:
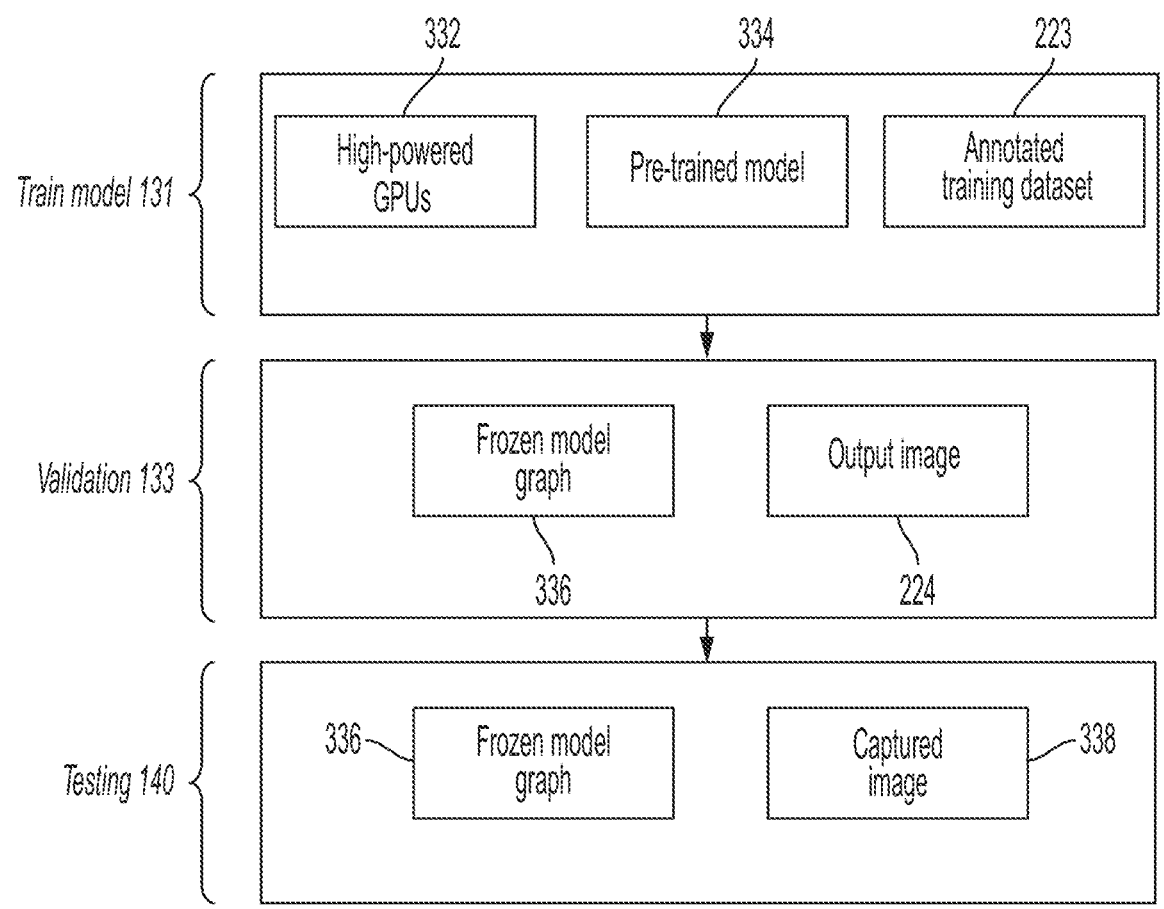
FIG. 3A illustrates a method for training a model, validation, and testing, according to some embodiments.

In some embodiments, the model 100 can perform a multi-step process of training the model and validating its results 130 using the training dataset. FIG. 3A illustrates a method for training a model, validation, and testing, according to some embodiments.

Training the model at step 131 can use several blocks: high-powered graphics processing units (GPUs) 332, a pre-trained model 334, and annotated training dataset 223. In some embodiments, the pre-trained model 334 can be used to help train the machine learning model. In some embodiments, the pre-trained model 334 can be an abstract mathematical representation of neural network weights. In some embodiments, the machine learning model may be represented by a set of weights in an artificial neural network.

During training, the model 100 can learn how to detect the target object in the annotated training dataset 223 (e.g., annotated synthetic images). In some embodiments, the model can learn to automatically identify patterns in the training dataset that correlate to targeted object(s). The patterns in the training dataset may correspond to the properties of the target object, and such information may be captured in a machine learning model.

The model may also capture patterns in the target object that are in unseen images. In some embodiments, the model can use higher level features (instead of point cloud) to detect the target object. The higher level features used for the detection can be determined by training the model on the training dataset.

During run-time, the model can then be capable of identifying the target object in two-dimensional image data (e.g., data from the image of the real world object captured by camera 184). The targeted object(s) can be a specific object (s) that the user, application, or both wants the system to recognize. In some embodiments, the model 100 can be configured to identify whether or not the target object 214 is in the captured image. In some embodiments, the analysis of the image can include identifying the location of the target object within the image space.

Once the model 100 is trained, it can be validated and tested. Validation at step 133 can include a plurality of blocks: a frozen model graph 336 and an output image 224. The output image 224 is the image predicted by and output from the model 100. The model can perform validation on the output image 224 using the frozen model graph 336. Testing 140 can use a plurality of blocks: a frozen model graph 336 and a captured image of the object 338 (from camera 184), where the model can be tested on the real world image 338. In some embodiments, the validation 133 and testing 140 steps may be performed at or near real-time.

Figure 3B:
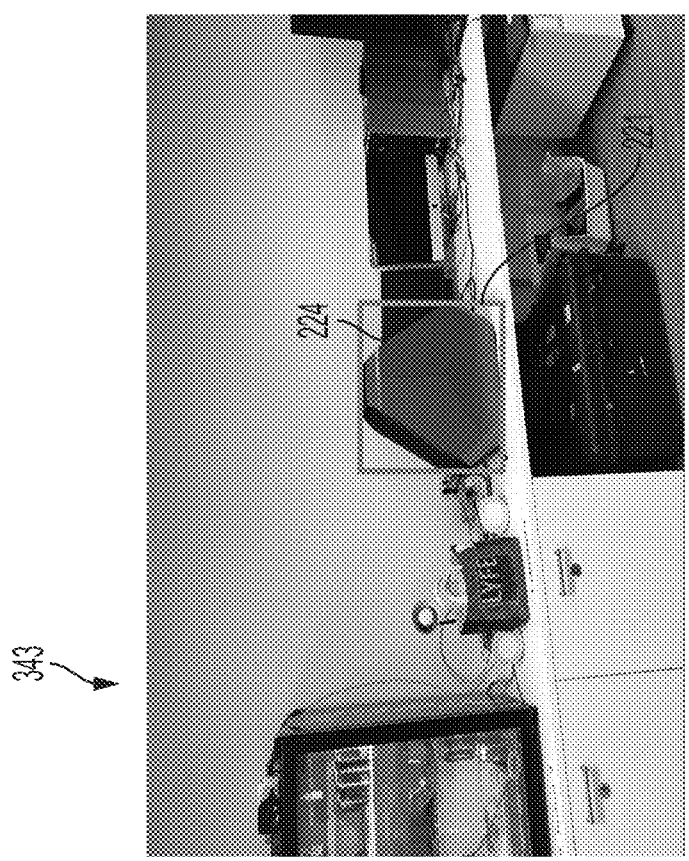
FIG. 3B illustrates an exemplary output image, according to some embodiments.

FIG. 3B illustrates an exemplary output image 343, according to some embodiments. In some embodiments, the identification of the target object 214 can include creating a bounding box 221.

The model can be used for several different types of AR/MR applications. For example, the model can be used to develop training tools (e.g., an instruction manual) for how to use, maintain, and/or repair a real world device, such as machinery and other equipment. As another example, the model can be used for information gathering, analysis, and monitoring of equipment and machinery. For example, multiple engineers and technicians in a variety of industries (e.g., information technology, the aviation industry, etc.) may be required to understand how to service complex machinery. Traditional training methods of providing these employees with the requisite knowledge may require large costs (e.g., from training sessions, from training materials, etc.). Further, the transferability of the training may be limited as understanding how one machine works may not guarantee that the employee will understand the internals of a similar machine, for example. Instead, an AR/MR application can produce virtual models of machinery that can be placed in directly in the technician's field of view. The AR/MR application can help guide the technician through any servicing task.

Further, the AR/MR application may help an unskilled or untrained user walk through the maintenance or servicing process. For example, the application may present the instructions in the user's field of view, along with highlighting certain elements, such as which component of the actual computer itself needs repair. In some embodiments, the mobile device can include sensors that can monitor the user's progress and provide feedback.

The model may also be used to create natural interfaces for controlling a real world devices like lights, HVAC equipment, appliances, etc. Existing interfaces for effecting changes in the environment may require a process of mental mapping and translation. Users must access, interpret, and translate information between a screen and the physical environment around them. While certain user interface designs may make this process simpler, the mental mapping may be a barrier that can cause errors and inefficiencies across most industries and systems.

An AR/MR application can implement controls placed in the user's actual field of view, creating an immediate connection to the devices themselves. The AR/MR application may allow the user to avoid translating between diagrams and the real world. Further, the AR/MR application may help prevent a user from trying to guess or memorize the purpose of a menu or interface.

As another example application, the model may develop museum-like experiences to inform users about physical objects.

In some embodiments, steps 110, 120, 130, and 140 can be repeated when the target object changes. For example, synthetic images can be generated and the model can be trained to identify a computer tower as the target object. When the real world environment 182 changes because the user has removed the chassis to the computer tower, the target object can change to a mother board. The model can then be trained to identify the motherboard as the target object.

Figure 4:
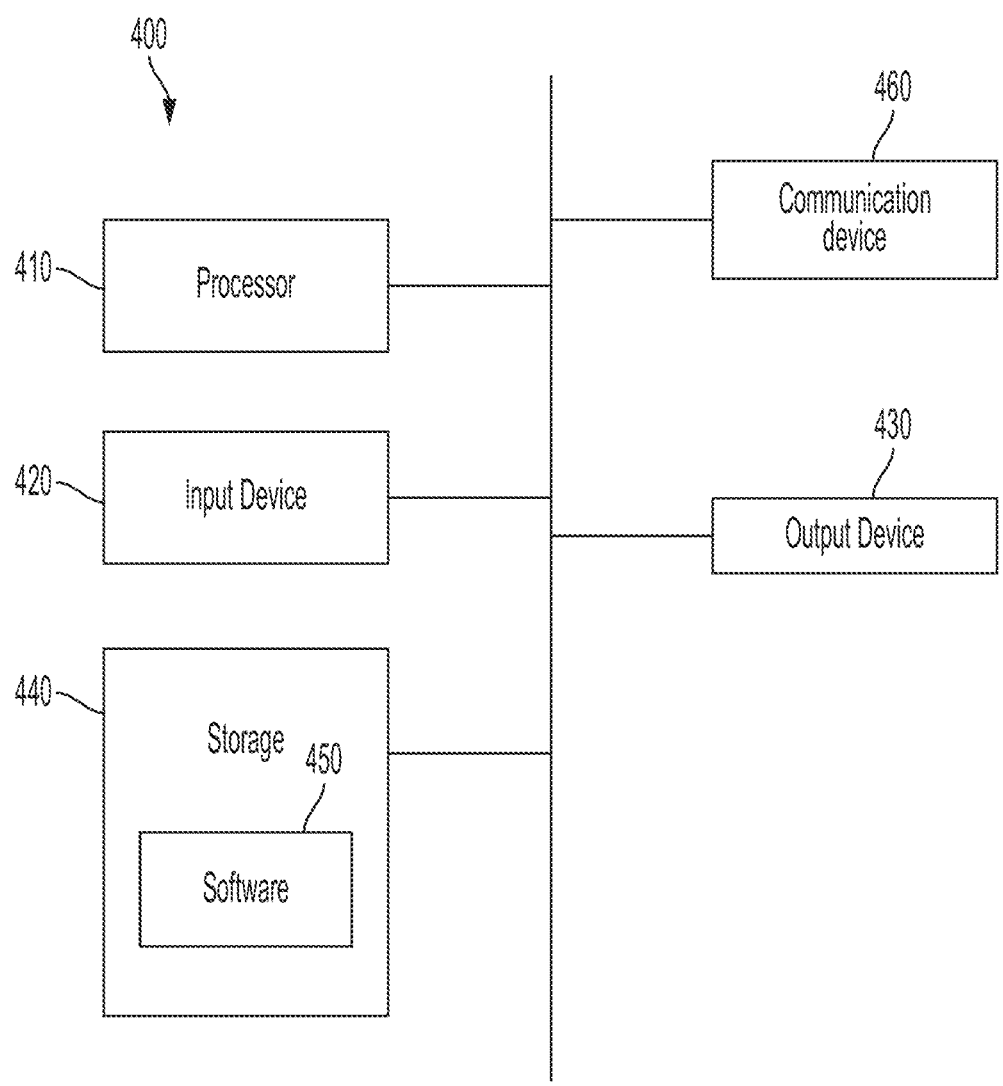
FIG. 4 illustrates an exemplary computing device, according to some embodiments.

FIG. 4 illustrates an exemplary computing device, according to some embodiments. Device 400 can be a host computer connected to a network. Device 400 can be a client computer or a server. As shown in FIG. 4, device 400 can be any suitable type of microprocessor-based device, such as a personal computer, work station, server, or handheld computing device (portable electronic device) such as a phone or tablet. The device can include, for example, one or more of processor 410, input device 420, output device 430, storage 440, and communication device 460. Input device 420 and output device 430 can generally correspond to those described above and can either be connectable or integrated with the computer.

Input device 420 can be any suitable device that provides input, such as a touchscreen, keyboard or keypad, mouse, or voice-recognition device. Output device 430 can be any suitable device that provides output, such as a touchscreen, haptics device, or speaker.

Storage 440 can be any suitable device that provides storage, such as an electrical, magnetic, or optical memory including a RAM, cache, hard drive, or removable storage disk. Communication device 460 can include any suitable device capable of transmitting and receiving signals over a network, such as a network interface chip or device. The components of the computer can be connected in any suitable manner, such as via a physical bus, or wirelessly.

Software 450, which can be stored in storage 440 and executed by processor 410, can include, for example, the programming that embodies the functionality of the present disclosure (e.g., as embodied in the devices described above).

Software 450 can also be stored and/or transported within any non-transitory, computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 440, that can contain or store programming for use by or in connection with an instruction-execution system, apparatus, or device.

Software 450 can also be propagated within any transport medium for use by or in connection with an instruction-execution system, apparatus, or device, such as those described above, that can fetch instructions associated with the software from the instruction-execution system, apparatus, or device and execute the instructions. In the context of this disclosure, a transport medium can be any medium that can communicate, propagate, or transport programming for use by or in connection with an instruction-execution system, apparatus, or device. The transport readable medium can include, but is not limited to, an electronic, magnetic, optical, electromagnetic, or infrared wired or wireless propagation medium.

Device 400 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 400 can implement any operating system suitable for operating on the network. Software 450 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has made reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments, with various modifications, that are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A method for training a model, the method comprising:
generating a plurality of synthetic images, the generation including selecting parameters of environmental features, camera intrinsics, and a target object, the target object being a simulation of a physical object, wherein the generation of the plurality of synthetic images includes generating a greater number of synthetic images assigned high probabilistic weights than low probabilistic weights, the assigned probabilistic weights representing a likelihood of the target object being associated with the selected parameters;
annotating the plurality of synthetic images with information related to properties of the target object; and
training the model to detect the physical object using the plurality of annotated synthetic images.

2. The method of claim 1, wherein the generation of the plurality of synthetic images includes generating a number of synthetic images, wherein the number is not pre-defined.

3. The method of claim 1, wherein each of the plurality of synthetic images has at least one parameter different from the others of the plurality of synthetic images.

4. The method of claim 3, wherein the at least one parameter is one or more of: camera angle, lighting effects, and camera setting.

5. The method of claim 3, wherein the at least one parameter is one or more of: target object size, target object color, and target object texture.

6. The method of claim 1, wherein the annotation of the plurality of synthetic images includes using information from the generation of the plurality of synthetic images to define bounding boxes around the target object.

7. The method of claim 1, wherein the annotation of the plurality of synthetic images includes adding class name and object location information to files representative of the plurality of synthetic images.

8. The method of claim 1, wherein the training of the object detection model includes automatically identifying patterns in the plurality of annotated synthetic images that correlate to the targeted object.

9. The method of claim 1, wherein the generation of the plurality of synthetic images includes not varying one or more target properties.

10. A method for using a model to detect a physical object, the method comprising:
receiving an image of a physical object;
using the model to detect the physical object, the object detection model being created by:
generating a plurality of synthetic images, the generation including selecting parameters of environmental features, camera intrinsics, and a target object, the target object being a simulation of the physical object, wherein the generation of the plurality of synthetic images includes generating a greater number of synthetic images assigned high probabilistic weights than low probabilistic weights, the assigned probabilistic weights representing a likelihood of the target object being associated with the selected parameters;
annotating the plurality of synthetic images with information related to properties of the target object; and
training the model to detect the physical object using the plurality of annotated synthetic images.

11. The method of claim 10, wherein the model is used to instruct a user how to use, maintain, and/or repair a device.

12. A system for training a model, the system comprising one or more processors and a memory, wherein the one or more processors are configured to execute instructions stored on the memory to cause the system to:
generate a plurality of synthetic images, the generation including selecting parameters of environmental features, camera intrinsics, and a target object, the target object being a simulation of a physical object, wherein the generation of the plurality of synthetic images includes generating a greater number of synthetic images assigned high probabilistic weights than low probabilistic weights, the assigned probabilistic weights representing a likelihood of the target object being associated with the selected parameters;
annotate the plurality of synthetic images with information related to properties of the target object; and
train the model to detect the physical object using the plurality of annotated synthetic images.

13. The system of claim 12, wherein the generation of the plurality of synthetic images includes generating a number of synthetic images, wherein the number is not pre-defined.

14. The system of claim 12, wherein each of the plurality of synthetic images has at least one parameter different from the others of the plurality of synthetic images.

15. The system of claim 12, wherein the training of the model includes automatically identifying patterns in the plurality of annotated synthetic images that correlate to the targeted object.

16. The system of claim 12, wherein the generation of the plurality of synthetic images includes not varying one or more target properties.

\* \* \* \* \*